United States Patent Office 2,739,133
Patented Mar. 20, 1956

2,739,133

MOLYBDENA CATALYST

Eugene F. Schwarzenbek, Montclair, N. J., assignor to The M. W. Kellogg Company, Jersey City, N. J., a corporation of Delaware No Drawing. Application December 17, 1951, Serial No. 262,165

11 Claims. (Cl. 252—442)

This invention relates to an improved catalyst composition, and more particularly pertains to a mixture of catalysts which is especially adapted for chemical conversions.

Reference is made to application Serial No. 262,166, which claims the use of the present novel catalyst in a process for the conversion of hydrocarbons.

It is known in the art that a catalyst consisting of molybdena or molybdenum on a carrier material is useful for chemical conversions, particularly for reforming petroleum stocks for improvement in octane number. In reforming, a low octane feed stock is converted to a higher octane product with some degradation in yield of desired liquid product. The molybdena or molybdenum on a supporting material performs satisfactorily in comparison with some materials for catalyzing the reforming operation. However, constant effort is being made to derive catalysts which are superior. In this respect, the present invention is concerned with a novel catalyst composition which is superior over the supported molybdena or molybdenum catalyst known heretofore.

It is an object of this invention to provide an improved catalyst composition.

Another object of the present invention is to provide a mixture of catalysts which is especially adapted for chemical conversions.

A further object is to provide a novel catalyst composition which is especially adapted for catalyzing hydrocarbon conversions.

Still another object of this invention is to provide an improved catalyst composition which is especially adapted for reforming petroleum naphtha stocks.

Other objects and advantages of this invention will become apparent as the description proceeds.

In accordance with this invention, the novel catalyst composition comprises a mixture of a substantially halogen-free molybdena and/or molybdenum catalyst and a halogen-containing molybdena and/or molybdenum catalyst. For convenience, the molybdena and/or molybdenum will be referred to hereinafter as the catalytic agent, and it should be understood that molybdena includes any of the oxides of molybdenum which possess catalytic activity for chemical conversions.

The improvements of the present invention are obtained by using a mixture of substantially halogen-free and halogen-containing catalysts in any relative proportions. Ordinarily, the relative concentration of the components in the catalyst mixture are about 5 to about 95% of the halogen-containing catalyst component, preferably about 10 to 40% of the halogen-containing catalyst component, based on the total weight of the catalyst mixture. The halogen-containing catalyst component contains halogen primarily in the chemically combined form, so that at elevated temperatures and pressures under which the catalyst is used in practice there is little or no loss of halogen from volatilization, etc. Some of the halogen may be combined physically and still be suitable for certain types of operations, however, it is preferred to have the halogen in the chemically combined form. In general, the amount of halogen in this catalyst component is about 0.1 to about 10%, preferably 0.5 to about 5%, based on the total weight of the catalyst component. Any one of the halogens or mixtures of two or more of them can be present in the catalyst component. Accordingly, halogens such as fluorine, chlorine, bromine, etc., can be employed, however, it is preferred to use fluorine because of its exceptional stability to remain combined in the catalyst.

The halogen-free catalyst component can be substantially of the same composition as the halogen-containing component except for the halogen content. Alternatively, the halogen-free catalyst component can be of a dissimilar character such that it will contain a different supporting material or a different catalytic agent than the halogen-containing catalyst component.

As previously indicated, the catalytic agent for each component of the catalyst mixture can be molybdena and/or molybdenum. Molybdena includes all of the oxides of molybdenum which possess some utility for catalyzing chemical conversions. Usually, the molybdena is present in the catalyst component as the dioxide, trioxide, or both. With respect to reforming of petroleum naphthas, fresh catalyst containing substantially all molybdenum trioxide is subjected to a preliminary reduction treatment to change the catalytic agent from the trioxide to a lower form of oxide, e. g., the dioxide. In some instances, it is believed that the conditions of reduction are sufficient to produce a final catalyst having small amounts of molybdenum present along with the oxide or oxides. This explanation is given merely to illustrate the type of catalytic agent which can be found in a particular catalyst which is used for hydroforming, however, it should be understood that this invention includes within its scope the use of catalytic agents comprising solely molybdenum, the dioxide or trioxide thereof, or mixtures of one or more of the foregoing in any relative proportions and for catalyzing chemical conversions as well as reforming of petroleum naphthas.

The halogen-free catalyst component can comprise the catalytic agent alone or it can be supported on a carrier material, such as for example, alumina, silica, zirconia, thoria, pumice, fuller's earth, kieselguhr, etc. With respect to the halogen-containing catalyst component, it is preferred that one or combinations of two or more of the above supports be employed, because the halogen is stably held in the catalyst component. The carrier provides additional material which can combine with the halogen in making up the halogen-containing component. Generally, for both components of the catalyst mixture, the catalytic agent comprises about 0.1 to about 25% based on the total weight of the catalyst component. The remainder, taking into consideration the combined halogen, is the carrier material. Concerning the mixture of the two catalyst components, the usual concentration of catalytic agent runs about 0.1 to about 25%, preferably about 5 to about 15% by weight, based on the total weight of the catalyst mixture. As would be expected, the halogen content of the catalyst mixture is lower than for the halogen-containing component, and it is generally about 0.005 to about 10%, preferably about 0.05 to about 2% by weight, based on the total catalyst mixture. In order to enhance the stability of the catalyst towards elevated temperatures, silica is employed either alone or in combination with another support, e. g., alumina, as the carrier material. The silica can be used as the support in either of the catalyst components or both. Generally, silica constitutes about 0.1 to about 15% by weight, preferably about 1 to about 5% based on the total catalyst mixture.

The improved catalyst of this invention can be used as either a granular, lump or finely divided material in deriving the unusual benefits in chemical conversions. The granular catalytic material can have an average particle size in the range of about 0.1 to about 10 mm.; whereas the finely divided material can have a particle size in the range of about 5 to about 200 microns. Ordinarily, the present catalyst mixture can be used in either a static or fluid system for chemical conversions. A more intimate or efficient contact between the reactant materials and the catalyst is obtained in fluid systems employing finely divided catalytic material. In such a system, the reactant materials, in a gaseous state, are passed upwardly through a mass of finely divided catalytic material at velocities sufficient to produce a lean or dense bed. The dense bed is preferred because of the better control of reaction conditions and higher product yields obtained. In any system, the catalyst may be circulated from the conversion zone to a regeneration zone wherein catalyst activity is restored by removing part or all of the undesirable deposits which are formed during the conversion step. Circulation of catalyst from one zone to another does not seriously effect catalyst activity nor is there any subtstantial loss of catalyst due to attrition, etc. Consequently, the novel catalyst mixture of this invenion can be used in a static or a fluid system in which the catalyst may or may not be circulated from one processing zone to another. Particularly, my invention is especially applicable to a fluid hydroforming system employing both a reactor and a regenerator for the conversion of petroleum naphtha to a higher octane product, and in which, catalyst is circulated between the processing vessels.

The catalyst components with and without combined halogen can be prepared by a variety of methods for application under the present invention. The following are examples of general methods by which the catalyst component which is substantially free of halogen can be prepared for use in the present invention:

(1) Aluminum, metal, water, formic acid, and mercury are reacted under suitable conditions and proportions to obtain a hydrous alumina or alumina sol. Molybdenum trioxide is dissolved in ammonium hydroxide to produce ammonium molybdate. The ammonium molybdate and alumina sol, in desired relative proportions, are admixed, dried and calcined to give a suitable molybdena catalyst.

(2) In the preparation described above under (1), the alumina sol is ordinarily at a pH of about 4. As an alternative method, ammonia or ammonium hydroxide is added to the alumina sol in order to increase the pH to about 5 and not more than about 12. Such a technique reduces the corrosivity of the alumina sol and thereby alleviates handling problems.

(3) The ammonium molybdate which is prepared in accordance with (1) above, can be added to the dried and/or calcined supporting material, e. g., alumina.

(4) The molybdena can be supplied in the form of molybdic acid, $H_3MoO_4$, for incorporation into the carrier material which is freshly prepared and/or dried and/or calcined. The molybdic acid may be prepared by reacting ammonium molybdate with hydrazine hydrate producing a gelatinous brown precipitate of molybdic acid.

(5) Molybdenum trioxide can be laid down on a suitable support by placing a desired quantity in a tube which can be externally heated to a temperature where the molybdena sublimes. Nitrogen gas is passed through the subliming mass of molybdena in order to carry away the sublimed molybdena to a mass of supporting material which is maintained at a lower temperature, so that the molybdena will condense thereon.

(6) The calcined support, e. g., alumina, can be immersed in solution of ammonium molybdate for a suitable time whereby the desired amount of molybdate is sorbed by the carrier material. Thereafter, the catalyst mass is dried and calcined.

(7) The carrier material in the form of a salt, e. g., aluminum chloride, is admixed with a molybdate salt in proper relative proportions. Thereafter, hydrazine hydrate is added to the mixture in order to co-precipitate the catalyst components.

(8) In all of the methods described above, molybdena is derived from ammonium molybdate. It is also intended that the molybdate salt can be in the form of a metallic salt, such for example, sodium molybdate, potassium molybdate, etc. This method is preferably used in those instances where foreign metallic ions do not adversely affect to a significant extent the chemical conversion operation.

(9) A suitable carrier material, e. g., alumina, is impregnated with a slurry of molybdenum trioxide. The catalyst mass is then dried and calcined. In such a technique, it is desirable to employ relatively high calcination temperatures in order to insure uniform distribution of molybdena on the carrier material. Accordingly, it is preferred to employ silica as an additional carrier material to impart greater heat stability to the catalyst mass.

The above described methods relate to the preparation of the catalyst component which is substantially halogen-free. However, these methods can be modified in order to derive a catalyst containing halogen. Examples of modifications to the above described catalyst preparations are as follows: (1) add the halogenating agent to the carrier material during the preparation thereof; (2) add the halogenating agent to (a) the sol form of the carrier material, (b) the gel form of the carrier material, (c) the dried carrier material, or (d) the calcined carrier material; (3) halogenate the finished catalyst component; (4) add the halogenating agent to the catalytic agent solution, i. e., ammonium molybdate, etc.; and (5) add the halogenating agent to the catalyst component mass which has been dried and/or calcined.

The halogen-containing catalyst component is obtained by employing a variety of different halogenating agents. Halogenating agents which are useful for this purpose can be, for example, hydrogen halides, ammonium halides, alkali metal halides, oxyhalide acids, etc. Of the halogenating agents enumerated, it is preferred to use a hydrogen halide because it readily combines with the catalyst component mass to produce a product containing stably held halogen. Examples of the halogenating agents are hydrogen fluoride, hydrogen chloride, hypofluorous acid, hypochlorous acid, ammonium fluoride, chloric acid, fluosilicic acid, etc.

The above methods of catalyst preparation are given as illustrations, however, more details and other methods of preparation should be apparent to those skilled in the art, because such information is available in the prior art.

After the constituent parts of a catalyst component have been admixed in the desired proportions, the mass is subjected to a drying operation in order to remove all or a substantial part of the volatile material. Ordinarily, drying is accomplished at a temperature of not more than about 400° F., and preferably about 200° to about 250° F. The drying operation can be conducted over an extended period of time such as about 15 to about 60 hours, or it can be a relatively short period in which the volatile materials are flashed off instantaneously. The flashing can be accelerated by the use of sub-atmospheric pressures. In such a case removal of volatile material from the catalyst mass will be accomplished in a relatively short period of time, such as for example, about 5 minutes to about 2 to 3 hours. After the catalyst mass is dried, it is then subjected to a calcination treatment whereby the catalytic agent is deposited on the carrier material in the desired manner and form. This calcination treatment is conducted at a temperature of at least 400° F. more usually at a temperature of about 600° to about 1500° F., and preferably about 700° to about 1250° F. Excessively high temperatures are to be avoided because there is a loss or decline of catalyst activity at very high temperatures. The calcination treatment is ordinarily conducted for a period of up to about 10 or more hours, more usually about 3 to about 6 hours. The time of treatment is also important from the standpoint that catalyst activity declines when the catalyst mass is exposed at elevated temperatures for unduly long periods of time. As a result, it is preferred to conduct the calcination treatment for a relatively short period of time. The drying and calcination operations can be accomplished as a single operation, in that, the catalyst mass is subjected to elevated temperatures, such as in the range of about 700°–1100° F., for example, about 1000° F., in order that the volatile matter is removed very rapidly and the catalyst becomes calcined. However, it is preferred to employ the method of first drying the catalyst mass at relatively low temperatures and for relatively long periods of time, and then subjecting same to calcination temperatures. This method appears to produce a catalyst of greater activity than in the case of preparing a catalyst by the method of instantaneously drying and then calcining at elevated temperatures.

Catalysts prepared according to the present invention possess numerous outstanding advantages and have a wide field of utility. In general, it appears that these contact materials are suitable for any reactions which are susceptible to catalysis with molybdena and/or molybdenum. They are useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i. e., cracking under hydrogen pressure), isomerization, oxidation, aromatization, cyclization, hydrodesulfurization, hydrocarbon synthesis, dealkylation, hydrodechlorination, dehydroxylation, alkylation, polymerization, and hydrogen exchange systems. In general, these reactions may be carried out under the conventional reaction conditions of temperature, pressure, etc., with the catalysts described herein. However, in many instances the activity of the new contact materials permits the employment of less severe conditions, especially lower temperatures and contact times, without any sacrifice in yield and quality. A wide variety of organic compounds may be dehydrogenated including naphthenes, paraffins, alkyl radicals in aralkyl compounds, butene, sterols, glycerides and many other organic compounds. By changing the reaction conditions in a known manner, these catalysts are also effective for hydrogenating organic compounds in general, and especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as in the hydroforming process in which the feed is customarily a low octane naphtha. In hydroforming with the novel catalysts a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact material is also contemplated. In the field of oxidative reactions, numerous changes can be effected with the present catalysts including the transformation of sulfur dioxide to sulfur trioxide, the formation of nitric acid and also of hydrazine from ammonia, the conversion of urea into hydrazine and the oxidation of hydrocarbons in general. An example of a catalytic hydrodechlorinization reaction of current importance, which may be catalyzed by the newly disclosed agents, is that in which hydrogen converts trifluorotrichloroethane into trifluorochloroethylene and hydrogen chloride. The contact materials of the present invention are also suitable for the hydrogen exchange system as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts; for example, the polymerization of olefins and the alkylation of aromatic compounds.

The present catalysts are especially useful for the reforming or hydroforming of naphthas into gasoline stocks of improved antiknock characteristics. Many benefits result from hydroforming with the new catalysts in comparison with known reforming catalysts. After partial deactivation due to the deposition of carbonaceous matter during hydroforming, the contact materials disclosed herein can be repeatedly regenerated by combustion in an oxygen-containing gas with substantially full restoration of activity. This adaptability to regeneration is important as it permits a broad variety of feed stocks to be processed successfully, including those of substantial olefin or sulfur contents and/or having end points considerably in excess of 400° F. Moreover, severe hydroforming conditions may be freely used as required in the production of higher antiknock fuels. In addition to being superior to all known similar types of hydroforming catalysts in activity and selectivity, superior flexibility and high selectivity have also been noted in comparison with other known reforming catalysts of a similar nature, especially in the higher octane ranges. Many economies in investment and operating costs are realized in hydroforming with the novel contact materials as a result of the smaller reactor, smaller separate regeneration vessel in a continuous system, longer on-stream period in a fixed bed system or lower regenerated catalyst replacement rate in a continuous system, and improved product selectivity.

In hydroforming naphtha or gasoline stocks with the catalyst disclosed herein, the conditions may be varied rather widely; thus temperatures of about 600° to about 1050° F. are suitable and the preferred range is from about 800° to about 950° F. Within these temperature limits weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the hydroforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10% of 1 to 3 carbon atom hydrocarbons, of the hydroforming reaction. The hydrogen serves an important function in maintaining the activity of the contact material by minimizing coke deposition thereon. While the total reaction pressure may be maintained at any value between about 50 and 1000 pounds per square inch gage (p. s. i. g.), the best results are obtained by holding the reaction pressure within the range between about 100 and about 750 p. s. i. g. In any event, the hydrogen pressure should not be allowed to become so great under any given set of reaction conditions that destructive hydrogenation is inaugurated, as this will result in a net consumption rather than a net production of hydrogen in the reaction. Although, in some cases it may be desirable to reform under conditions of net hydrogen consumption.

The following are examples of catalysts which can be used in making up the novel mixture of catalysts of the present invention.

CATALYST A

A solution of ammonium molybdate having a concentration sufficient to provide 2.4 pounds of $MoO_3$ per gallon of solution was prepared. To this solution was added substantially mineral-free water in a quantity to produce a hydrometer reading of 1.8 at 70° F. 2600 pounds of "activated alumina" (Grade F–10), purchased from the Aluminum Company of America were completely submerged in the solution for a total period of 45 minutes. At each 15 minute interval the alumina was removed from the solution for 1 minute. Thereafter, the catalyst mass was allowed to drain and then it was placed in a calciner which was maintained at 1200° F. After calcination the catalyst had an average molybdena content of 9% by weight. 475 grams of the catalyst were pelleted into $3/16$ inch pellets using 2% aluminum stearate as lubricant. Then the material was re-calcined at 1100° F. for 1½ hours.

CATALYST B

The catalyst was prepared by mixing (a) 900 grams of the catalyst which was prepared in accordance with the method described above as Catalyst A with (b) 100 grams of a fluorine containing catalyst prepared in the manner described below. With respect to component (b) i. e., fluorine containing catalyst, 510 grams of a calcined molybdena-on-gel-alumina catalyst (prepared by adding sufficient ammonium molybdate solution to aluminum formate sol to give a finished catalyst containing about 10% $MoO_3$, drying and calcining at 1200° F.), were warmed in an oven held at a temperature of about 240° F. The hot catalyst was impregnated with a solution of 35.1 grams of hydrogen fluoride in 400 cc. of water. The presence of excess liquid necessitated heating the impregnated catalyst until the liquid was evaporated. The wet solid was dried for a period of about 16 hours at 240° F., and then calcined for a period of 1.5 hours at 1200° F. The catalyst was then ground to pass through a 30 mesh screen.

The final catalyst composition constituted a mixture of (a) 900 grams of Catalyst A, and (b) 100 grams of fluorine containing catalyst prepared by the method described above. The fluorine containing catalyst analyzed 9.8% $MoO_3$ and 2.9% fluorine. The mixture of catalysts was pelleted into $3/16$ inch pills using 2% of aluminum stearate as lubricant. The pellets were calcined for 1½ hours at a temperature 1100° F. 475 grams of the catalyst, or 500 cc. by volume were charged to a test unit for evaluation.

CATALYST C 750 grams of Catalyst A and 250 grams of component (b) of Catalyst B were mixed thoroughly and pelleted into $3/16$ inch pills by using 2% of aluminum stearate as lubricant. The pellets were calcined for a period of 1½ hours at a temperature of 1100° F. 475 grams of catalyst, or 500 cc. by volume, of the catalyst were charged to the laboratory unit for evaluation.

CATALYST D 400 grams of Catalyst A and 100 grams of component (b) of Catalyst B were mixed thoroughly and then pelleted into $3/16$ inch pills, using 2% of aluminum stearate as lubricant. The pills were calcined for 1½ hours at 1100° F. 475 grams of the calcined pills, 530 cc. by volume, were charged to a laboratory unit for evaluation.

CATALYST E

This catalyst is the fluorine containing catalyst, which is component (b) of Catalyst B. This catalyst analyzed 2.91% fluorine and 9.8% $MoO_3$. The catalyst was made in $3/16$ inch pills using 2% of aluminum stearate, and the material was calcined for 1½ hours at 1100° F. 375 grams of the catalyst, 370 cc. by volume, were charged to a laboratory unit for evaluation.

Samples of the above catalysts were tested in a hydro-forming laboratory unit using a fixed bed laboratory reactor. The results of these tests are reported in Table I below. The experiments were made with a Mid-Continent heavy naphtha having a relatively high end point. This feed stock has the following characteristics:

| | |
|---|---|
| ASTM distillation | I. B. P. 228° F.—E. P. 4.28° F. |
| °API | 51.7 |
| Wt. percent sulphur | 0.05 |
| Wt. percent aromatics | 9 |
| Aniline pt | 139 |
| Octane No. (CFRM) | 29.9 |

This is a difficult feed stock to hydroform because of its relatively low naphthenic content and its tendency to form relatively large carbonaceous deposits on a catalyst. The catalysts in suitable quantities were charged to the hydroforming reactor. Heat was applied to the reactor in order to obtain the desired reaction temperature. Nitrogen was passed through the reactor in order to remove any extraneous air which might be held therein. Following the nitrogen purge, hydrogen was circulated through the reactor for about one hour while the desired temperature was attained. During this operation, the temperature at various points in the bed was ascertained with two thermocouples, one located in the upper part and one in the lower part of the bed. After the hydrogen rate had been adjusted to the desired quantity and the temperature was relatively constant at the desired level, naphtha vapor was charged to the reactor at the desired rate.

The results obtained in hydroforming naphtha by the use of the various catalysts are reported in Table I.

*Table I*

| Test No | I | II | III | IV | V |
|---|---|---|---|---|---|
| Catalyst | (A) | (B) | (C) | (D) | (E) |
| Temperature | 896 | 896 | 891 | 893 | 904 |
| Pressure | 500 | 500 | 500 | 500 | 500 |
| Space Velocity, $W_o$/hr./$W_c$ | 0.97 | 1.01 | 1.02 | 1.01 | 1.05 |
| Reaction Period, hrs | 8 | 8 | 8 | 8 | 8 |
| $H_2$ rate (S. C. F. B.) | 4,340 | 4,480 | 4,680 | 4,995 | 4,770 |
| Yields, Vol. Percent (Output Basis): | | | | | |
| $C_4$ free gasoline | 87.7 | 83.6 | 82.2 | 83.4 | 65.5 |
| 100% $C_4$ gasoline | 91.6 | 88.5 | 90.6 | 90.6 | 99.7 |
| 10% RVP gasoline | 98.6 | 94.4 | 92.2 | 93.2 | 69.5 |
| Aromatics | 32.5 | 35.2 | 35.7 | 37.2 | 41.9 |
| Octane Nos.: | | | | | |
| 100% $C_4$ gasoline— | | | | | |
| CFRM | 65.0 | 68.1 | 73.8 | 74.1 | 84.5 |
| CFRR | 69.0 | 74.0 | 79.5 | 80.6 | 93.4 |
| 10# RVP gasoline— | | | | | |
| CFRM | 66.7 | 69.4 | 74.1 | 74.7 | 82.9 |
| CFRR | 71.1 | 75.6 | 79.9 | 81.2 | 91.3 |

From the above data, it is observed that the octane number of the products which are obtained when using catalyst mixtures of halogen-containing and substantially halogen-free catalysts are improved beyond what is expected on the basis of the individual effects of the catalyst components. In this respect, the octane number of the products in the case of the catalyst mixtures are greater than the summation of octane improvement which can be attributed to the individual catalyst components. Accordingly, this phenomenon clearly establishes a synergistic effect between a halogen-free catalyst and a halogen-containing catalyst. Such an occurrence is of great importance in view that naphthas are primarily reformed to obtain an octane improvement. In order to demonstrate the magnitude of the synergistic effect which is obtained when using a mixture of substantially halogen-free and halogen-containing catalysts, comparative data is presented in Table II below, showing the difference between theoretical or calculated octane numbers and the actual octane numbers of the product. The theoretical octane numbers were calculated on the basis of the proportion of the catalyst component and its effect when used alone on octane improvement.

*Table II*

| Test No | II | | III | | IV | |
|---|---|---|---|---|---|---|
| Catalyst | (B) | | (C) | | (D) | |
| | Theoretical | Actual | Theoretical | Actual | Theoretical | Actual |
| 100% C₄ Gasoline: | | | | | | |
| CFRM | 67 | 68.1 | 69.8 | 73.8 | 68.9 | 74.1 |
| CFRR | 71.4 | 74.0 | 75.0 | 79.5 | 73.9 | 80.6 |
| 10# RVP Gasoline: | | | | | | |
| CFRM | 68.3 | 69.4 | 70.7 | 74.1 | 69.9 | 74.6 |
| CFRR | 73.1 | 75.6 | 76.5 | 79.9 | 75.1 | 81.2 |

From Table II it is noted that in every instance where a mixture of a substantially halogen-free catalyst component and a halogen-containing component were employed for hydroforming a Mid-Continent naphtha, the octane numbers of the products are significantly higher than would be expected on the basis of the individual catalyst components. This is clearly demonstrated by the comparison of the actual octane numbers with those obtained by calculation on the basis of what would be expected from the individual effects of the catalyst components. Furthermore, it should be noted from Table I that satisfactory yields of products are obtained along with the synergistic effect of the octane numbers of the product. This clearly illustrates that the mixture of catalyst components cooperated in an unusual manner in producing a higher than expected octane improvement without the expected degradation of feed stock. Such a phenomena indicates the highly selective nature of the catalyst mixture in chemical conversion processes.

Having thus described my invention by reference to specific illustrations, it should be understood that no undue limitations or restrictions are to be imposed and that the scope of the invention is defined by the following claims.

I claim:

1. A composition comprising a mixture of a substantially halogen-free component containing a catalytic agent selected from the group consisting of molybdenum and an oxide thereof, and a halogen-containing component containing a catalytic agent selected from the group consisting of molybdenum and an oxide thereof.

2. A composition comprising a mixture of a substantially halogen-free component containing an oxide of molybdenum, and a halogen-containing component containing an oxide of molybdenum.

3. A composition comprising a mixture of a substantially halogen-free component comprising a catalytic agent selected from the group consisting of molybdenum and an oxide thereof on a carrier material, and a halogen-containing component comprising a catalytic agent selected from the group consisting of molybdenum and an oxide thereof on a carrier material.

4. The composition of claim 3 wherein the carrier material for the halogen-free component is alumina and the carrier material for the halogen-containing component is alumina.

5. The composition of claim 3 wherein the halogen in the halogen-containing component is fluorine.

6. A composition comprising a mixture of a substantially halogen-free component comprising an oxide of molybdenum on alumina, and a fluorine-containing component comprising an oxide of molybdenum on alumina.

7. A composition comprising a mixture of about 5 to about 95% by weight of a substantially halogen-free component comprising a catalytic agent selected from the group consisting of molybdenum and an oxide thereof on a carrier material, and about 95 to about 5% by weight of a halogen-containing component comprising a catalytic agent selected from the group consisting of molybdenum and an oxide thereof on a carrier material.

8. A composition comprising a mixture of about 5 to about 95% by weight of a substantially halogen-free component comprising the oxide of molybdenum on alumina, and about 95 to about 5% by weight of a halogen-containing component comprising an oxide of molybdenum on alumina.

9. A composition comprising a mixture of a substantially halogen-free component comprising an oxide of molybdenum on a carrier consisting of alumina and silica, and a halogen-containing component comprising an oxide of molybdenum on a carrier consisting of alumina and silica.

10. A composition comprising a mixture of about 5 to about 95% by weight of a substantially halogen-free component comprising an oxide of molybdenum on a carrier consisting of alumina and silica, and about 95 to about 5% by weight of a fluorine-containing component comprising an oxide of molybdenum on a carrier consisting of alumina and silica.

11. A composition comprising a mixture of about 10 to about 40% by weight of a fluorine-containing component comprising an oxide of molybdenum on alumina, and about 90 to about 60% of a substantially halogen-free component comprising an oxide of molybdenum on alumina.

References Cited in the file of this patent

UNITED STATES PATENTS

| | | |
|---|---|---|
| 2,211,208 | Ipatieff et al. | Aug. 13, 1940 |
| 2,348,624 | Hillman | May 9, 1944 |
| 2,369,734 | Heard | Feb. 20, 1945 |
| 2,400,025 | Scharmann | May 7, 1946 |
| 2,432,286 | Claussen et al. | Dec. 9, 1947 |
| 2,454,724 | Tamele et al. | Nov. 23, 1948 |
| 2,582,428 | Haensel | Jan. 15, 1952 |